March 1, 1960
R. F. GATES ET AL
2,927,272
WAVE ANALYZER
Filed Jan. 6, 1958
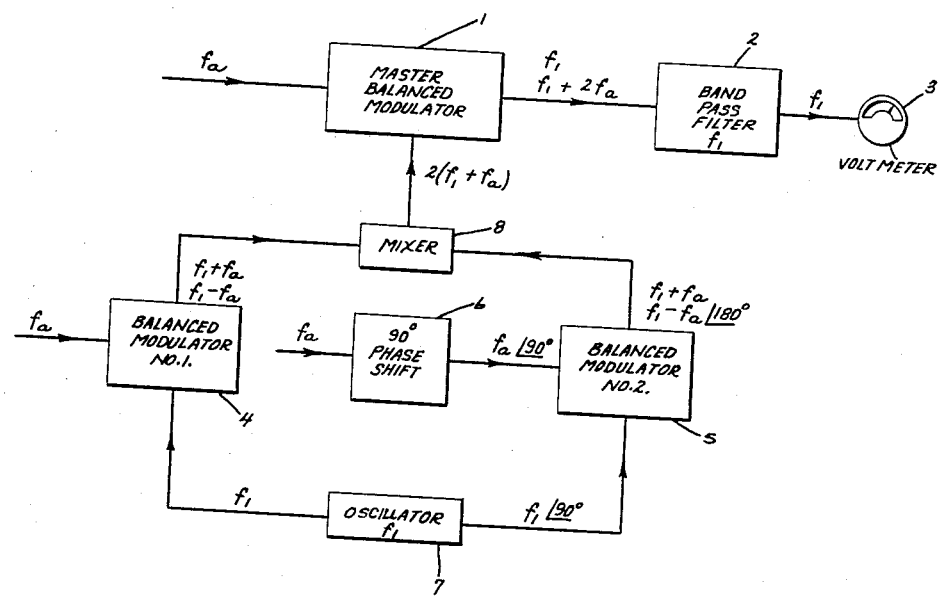
Inventors:
Robert F. Gates,
Perry E. Kendall,
by Gust & Diehl
Their Attorneys.

United States Patent Office 2,927,272
Patented Mar. 1, 1960

2,927,272
WAVE ANALYZER

Robert F. Gates, Syracuse, N.Y., and Perry E. Kendall, Fort Wayne, Ind., assignors to International Telephone and Telegraph Corporation Application January 6, 1958, Serial No. 707,364

3 Claims. (Cl. 324—118)

This invention relates to circuits for the measurement of electrical quantities, and more particularly to a circuit for measuring the amplitude of a signal over a narrow bandwidth where the frequency of the signal is subject to variation during the time of measurement.

In the design and testing of electronic equipment, it is frequently desirable to determine the "signal-to-noise" ratio of the equipment, i.e. the ratio of the amplitudes of the useful signal provided or passed by the equipment and an extraneous interference or noise signal inherently produced in the equipment and superimposed on the useful signal; in making such a measurement, a narrow bandwidth, or single frequency signal is generally employed, the superimposed noise signal commonly having a broad bandwidth, i.e. frequency components over a wide frequency spectrum. Wave analyzers are commercially available for making such routine signal-to-noise measurements and are entirely suitable for the purpose in the majority of cases where the frequency of the useful signal is relatively stable, i.e. not subject to drift or variation. Such presently available equipment conventionally includes a balanced modulator with a local oscillator supplying a fixed carrier frequency which is modulated by the signal, the signal-to-noise ratio of which is to be determined. The balanced modulator is a well known device which suppresses the carrier in its output and thus its output signal contains only the upper and lower side bands, i.e. the carrier frequency plus and minus the frequency of the modulating signal. The output of the balanced modulator is then passed through a narrow band pass filter which suppresses one of the side bands, the other side band being passed and its amplitude measured by conventional means, such as a vacuum tube voltmeter; the amplitude of the side band measured is proportional to the amplitude of the modulating signal. With such equipment, a measurement of the amplitude of the noise signal alone is also made, the useful signal source being cut-off, thus providing the information necessary to determine the signal-to-noise ratio.

There are instances, however, where the useful signal is subject to frequency variation during the time of measurement, and in such instances, presently available signal-to-noise equipment has been unsatisfactory; it will be seen that the side band passed by the band pass filter in the wave analyzer includes the frequency of the useful signal and thus, if the frequency of the useful signal drifts appreciably during measurement, the frequency of the side band employed will move outside of that passed by the band pass filter. Thus, in order to measure the signal-to-noise ratio of some devices, such as certain photoconductors in which the signal output is subject to rapid frequency variation, it is necessary to provide a wave analyzer which will permit amplitude measurements despite the frequency drift of the useful input signal.

It is therefore an object of this invention to provide a circuit for measuring the amplitude of a signal subject to frequency variation during measurement.

Another object of this invention is to provide a circuit for measuring the amplitude of a narrow band signal with broad band noise superimposed thereon, the signal being subject to frequency variation during measurement.

A further object of this invention is to provide a circuit for making signal-to-noise measurements of a signal subject to frequency variation during measurement.

In accordance with the broader aspects of our invention, we provide a circuit incorporating the balanced modulator and filter of prior circuits, but with the carrier frequency shifted or caused to track with variations in the frequency of the signal being measured. More specifically, we provide, in addition to the original or master balanced modulator, a pair of balanced modulators each employing the useful signal as a modulating frequency and having a common local oscillator supplying a fixed carrier frequency, however, both the modulating frequency and carrier frequency of one of the modulators are phase shifted by 90°. Thus one of the side bands in the output of the phase shifted modulator is in phase with a corresponding side band of the other modulator, the other side bands being 180° out of phase. The output signals of the two additional modulators are mixed, either additively or subtractively thus providing a signal which contains only one of the side bands, i.e. the carrier frequency plus or minus the frequency of the useful signal, as the case may be. This frequency is then used as the carrier frequency for the master balanced modulator which thus has in its output one side band which is the frequency of the local oscillator and another which is the local oscillator frequency plus or minus the useful signal frequency. The band pass filter is then arranged to pass only the local oscillator frequency, the amplitude of which varies in response to the amplitude of the useful signal. It is thus seen that variations in the frequency of the useful signal have no effect on the measurement since only the amplitude of the frequency of the local oscillator is measured.

The above-mentioned and other features and objects of this invention and the manner of attaining them will become more apparent and the invention itself will be best understood by reference to the following description of an embodiment of the invention taken in conjunction with the accompanying drawings, wherein the single figure of the drawing is a block diagram showing the preferred embodiment of our invention.

Referring now to the drawing, our improved circuit includes a "master" balanced modulator 1 which may be of any conventional type, the specific circuitry not forming a part of our invention. The signal upon which the measurement is to be made, designated as $f_a$, is fed to the modulating signal input circuit of the modulator 1, which has its output circuit connected to band pass filter 2; a suitable voltmeter 3, such as a conventional vacuum tube voltmeter is in turn connected to the band pass filter 2.

In order to supply a carrier frequency to the modulator 1 which automatically tracks the input frequency $f_a$, we provide two additional balanced modulators 4 and 5. The input signal $f_a$ is directly fed to the modulating signal input circuit of modulator 4, and is also fed to the modulating signal input circuit of modulator 5 through a 90° phase shifting network 6 of any conventional design; again, any conventional circuit may be used for the balanced modulators 4 and 5. The carrier frequency, designated as $f_1$ for modulators 4 and 5 is supplied by local oscillator 7, which may have any conventional circuit; oscillator 7 is however preferably of the highly stable crystal controlled type. The output circuit of the oscillator 7 is connected directly to supply the carrier frequency $f_1$ to modulator 4 and to supply the carrier frequency $f_1$ phase shifted by 90° to modulator 5; this may be accomplished for example by employing a midpoint grounded tank circuit in oscillator 7 with the connections to modulators 4 and 5 being made respectively on opposite sides of the grounded midpoint.

Recalling that a balanced modulator suppresses the carrier frequency so that its output contains only the upper and lower side bands, it will be seen that the output circuit of modulator 4 will have the two side bands $f_1+f_a$ and $f_1-f_a$. It will now also be recalled that the two side bands are 90° phase-displaced and thus, with the modulating signal $f_a$ and carrier frequency $f_1$ of modulator 5 being phase displaced by 90° one of the side bands in the output of modulator 5 will be in phase with one side band in the output of modulator 4 while the other side bands will be 180° out of phase, depending on the direction of the 90° phase shift of $f_a$ and $f_1$ fed to modulator 5; it may here be assumed that the $f_1+f_a$ side band of modulator 5 is in phase with the $f_1+f_a$ side band of modulator 4 and that the $f_1-f_a$ side bands are thus 180° out of phase.

The output circuits of modulators 4 and 5 are connected to a mixer circuit 8, again of any conventional design, which additively or subtractively mixes the output signals of each; additively mixing the outputs of modulators 4 and 5 will be seen to provide a resultant signal $2(f_1+f_a)$, (ignoring attenuation in the mixer 8) while subtractively mixing will provide a resultant signal $2(f_1-f_a)$. While the choice of additively or subtractively mixing will depend upon the actual frequencies employed, it will here be assumed that the outputs are additively mixed to provide a resultant signal $2(f_1+f_a)$.

This resultant signal $2(f_1+f_a)$ is fed to the carrier input circuit of the master balanced modulator 1 and thus serves as the carrier therefor; it will now be seen that the carrier frequency of modulator 1 includes the signal frequency $f_a$ as a component and will thus shift in response to variations in the frequency of $f_a$. It will now also be seen that one of the side bands in the output of modulator 1 will be $f_1$ alone, while the other is $f_1+2f_a$ (or $f_1-2f_a$ if subtractive mixing was employed in mixer 8). Band pass filter 2 is thus tuned to pass only $f_1$ and to reject the other side band frequency $f_1+2f_a$ (or $f_1-2f_a$). It will thus now be readily apparent that the voltmeter 3 measures the amplitude of an output signal having a frequency $f_1$ only, the amplitude being responsive to the amplitude input signal $f_a$, but not having any frequency variation responsive to variation in the frequency $f_a$ since it is determined by the stable local oscillator 7.

In an actual circuit constructed in accordance with this invention, $f_a$ was subject to rapid variation from 8 c.p.s. to 32 kc. and $f_1$ was 100 kc. with additive mixing being employed.

While the use of balanced modulators has been described and is preferred, it will be readily understood that depending upon the frequencies involved, conventional modulators, such as class B modulators may be employed with the carriers being suppressed by external filters.

It will now be seen that we have provided a circuit which will measure the amplitude of a signal, regardless of variation of the frequency of such signal during the time of measurement, and which thus finds particular utility in the making of signal-to-noise measurements on such apparatus as photoconductive devices in which the signal is deeply imbedded in broad-band noise and subject to rapid and wide frequency variation.

While we have described above the principles of our invention in connection with specific apparatus, it is to be clearly understood that this description is made only by way of example and not as a limitation to the scope of our invention.

What is claimed is:

1. A circuit for measuring the amplitude of a signal subject to frequency variation during measurement comprising: three modulating means each having a signal input circuit adapted to receive said signal, a carrier input circuit, and an output circuit, each of said modulating means including means for suppressing the carrier component of the output signal thereof; a phase shifting circuit connected to the input circuit of one of said modulating means for shifting the phase of said signal applied thereto by 90°; constant frequency oscillating means for generating a carrier signal, said oscillating means having a first output circuit connected to the carrier input circuit of a second of said modulating means for supplying said carrier signal thereto and having a second output circuit connected to the carrier input circuit of said one modulating means for supplying said carrier signal thereto phase shifted by 90° whereby said one modulating means has a signal output having one side band in phase and the other side band 180° out of phase respectively with the side bands in the output signal of said second modulating means; a mixing circuit having two input circuits connected respectively to the output circuits of said one and second modulating means for mixing the output signals thereof and for providing an output signal containing only one of the side band components of the output signal of said one and second modulating means, said mixing circuit having an output circuit connected to the carrier input circuit of the third of said modulating means whereby the signal output thereof has one side band having the frequency of said carrier signal and the other side band includes said signal frequency; a band pass filter circuit connected to the output circuit of said third modulating means and arranged to pass only said one side band thereof; and means connected to said filter circuit for measuring the amplitude of the signal passed thereby.

2. A circuit for measuring the amplitude of a signal subject to frequency variation during measurement comprising: three balanced modulators each having a signal input circuit adapted to receive said signal, a carrier input circuit, and an output circuit; a phase shifting network connected to the input circuit of one of said modulating means for shifting the phase of said signal applied thereto by 90°; constant frequency oscillating means for generating a carrier signal, said oscillating means having a first output circuit connected to the carrier input circuit of a second of said modulating means for supplying said carrier signal thereto and having a second output circuit connected to the carrier input circuit of said one modulating means for supplying said carrier signal thereto phase shifted by 90° whereby said one modulating means has a signal output having one side band in phase and the other side band 180° out of phase respectively with the side bands in the output signal of said second modulating means; a mixing circuit having two input circuits connected respectively to the output circuits of said one and second modulating means for mixing the output signals thereof and for providing an output signal containing only one of the side band components of the output signal of said one and second modulating means, said mixing circuit having an output circuit connected to the carrier input circuit of the third of said modulating means whereby the signal output thereof has one side band having the frequency of said carrier signal and the other side band includes said signal frequency; a band pass filter circuit connected to the output circuit of said third modulating means and arranged to pass only said one side band thereof; and means connected to said filter circuit for measuring the amplitude of the signal passed thereby.

3. A circuit for measuring the amplitude of a signal having a frequency $f_a$ subject to frequency variation during measurement comprising: three balanced modulators each having a signal input circuit adapted to receive said signal $f_a$, a carrier input circuit, and an output circuit; a phase shifting circuit connected to the input circuit of a first of said modulators for shifting the phase of said signal $f_a$ applied thereto by 90°; a constant frequency oscillator for generating a carrier signal having a frequency $f_1$, said oscillator having a first output circuit connected to the carrier input circuit of a second of said modulators for supplying said carrier signal $f_1$ thereto whereby said second modulator has side band signals $(f_1+f_a)$ and $(f_1-f_a)$, said oscillator having a second output circuit connected to the carrier input circuit of said first modulator for supplying said carrier signal $f_1$ thereto phase shifted by 90° whereby said first modulator has side band signals $(f_1+f_a)$ and $(f_1-f_a)$, with one side band being in phase with the corresponding side band of said second modulator and the other being 180° out of phase with the corresponding side band of said second modulator; a mixing circuit having an output circuit and two input circuits connected respectively to the output circuits of said first and second modulators for mixing said side bands to provide in its output circuit only one of the side bands of said first and second modulators, said output circuit of said mixing circuit being connected to the carrier input circuit of the third of said modulators whereby said third modulator has in its output circuit one side band having a frequency $f_1$ and the other side band having a frequency including $f_a$; a band pass filter circuit connected to the output circuit of said third modulator and arranged to pass only said one side band having a frequency $f_1$; and amplitude measuring means connected to said filter circuit for measuring the amplitude of the signal passed thereby.

References Cited in the file of this patent

UNITED STATES PATENTS

| | | |
|---|---|---|
| 2,558,790 | Smith | July 3, 1951 |
| 2,566,876 | Dome | Sept. 4, 1951 |
| 2,661,458 | Saraga | Dec. 1, 1953 |